INVENTOR,
Henry C. Harbers.
BY
Attorney

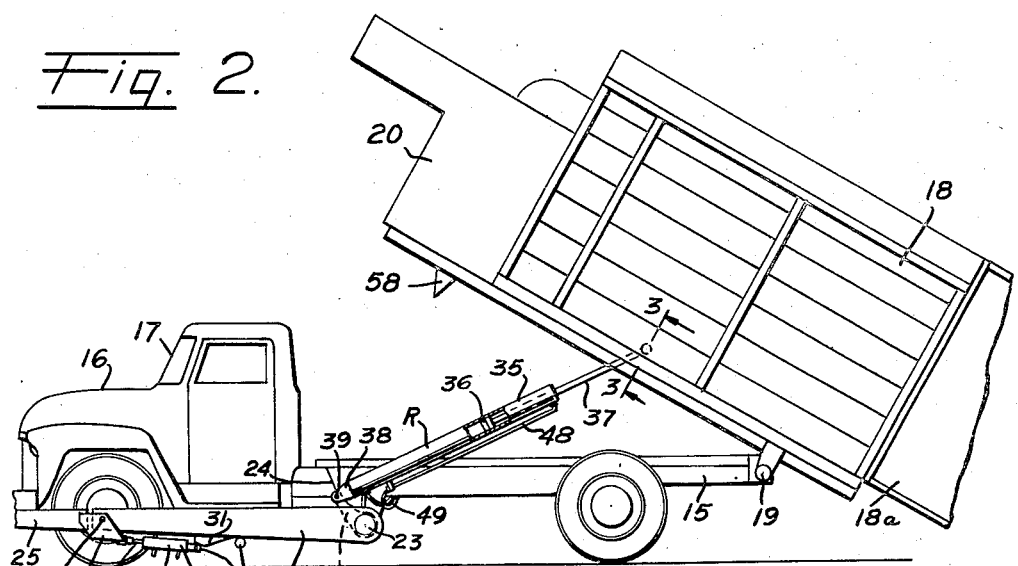
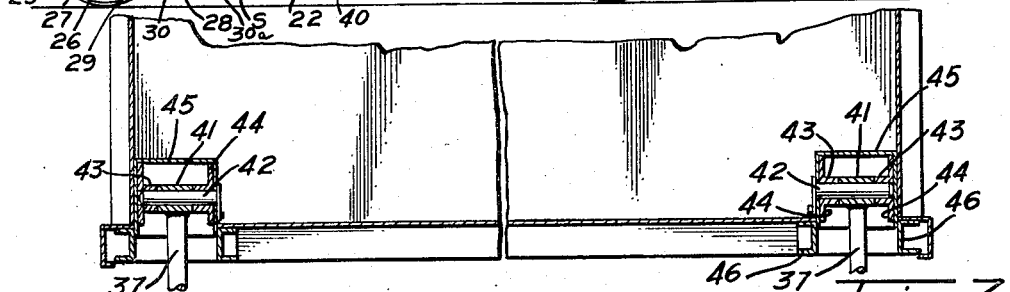
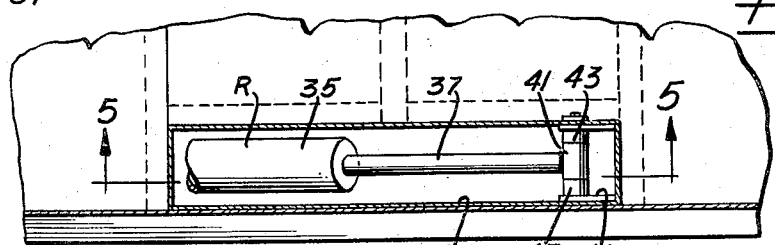
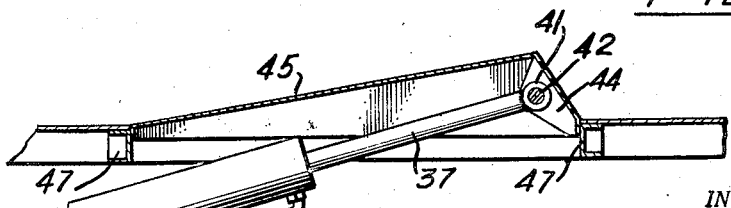
INVENTOR,
Henry C. Harbers.
BY
Attorney Feb. 25, 1958
H. C. HARBERS
2,824,655
DUMP BODY AND FRONT END LOADER ACTUATING
MECHANISM FOR DUMP TRUCKS
Filed July 16, 1956
3 Sheets-Sheet 3
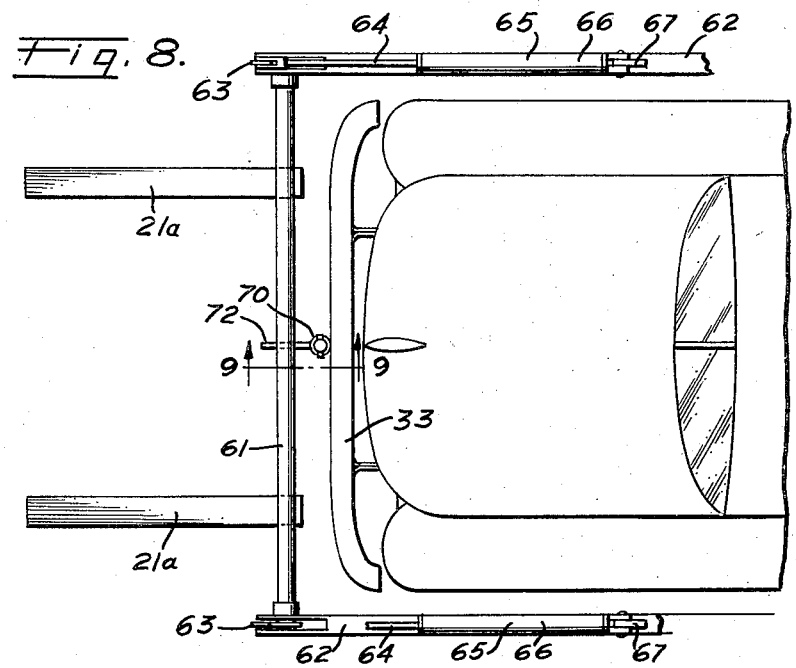
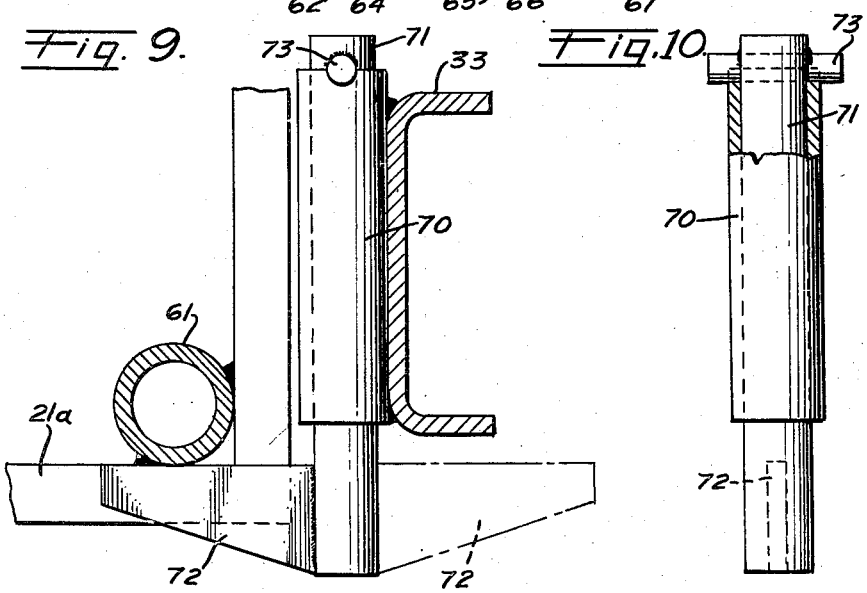
INVENTOR,
Henry C. Harbers.
BY
Attorney

United States Patent Office 2,824,655
Patented Feb. 25, 1958

2,824,655

DUMP BODY AND FRONT END LOADER ACTUATING MECHANISM FOR DUMP TRUCKS

Henry C. Harbers, Pasadena, Calif., assignor to Cook Bros. Equipment Co., Los Angeles, Calif., a corporation of California Application July 16, 1956, Serial No. 597,922

12 Claims. (Cl. 214—78)

My invention relates to dump trucks particularly designed, although not necessarily, for transporting rubbish, and having a front-end loader of the type which comprises a loading element in the form of a bucket, scoop, or fork, which is mounted on the front ends of a pair of lifting arms that are pivoted on opposite sides of the truck frame for swinging movement so that the loading element can be swung from a loading position at the forward end of the truck upwardly and rearwardly over the truck cab to a dumping position directly above the dump body. By repeated operations of the loader in this manner the dump body can be ultimately filled with rubbish whence, the truck is driven to a location and the rubbish dumped from the body by tilting the latter.

In dump trucks of this character as heretofore proposed, several single acting hydraulic means are employed to actuate the lifting arms, tilt the dump body, and oscillate the dump body to evenly distribute the rubbish along the length thereof, to compact the rubbish therein, and to loosen the rubbish when dumping to effect complete dumping. These several hydraulic means are expensive to construct, install and maintain since they require numerous hydraulic rams, with the necessary conduits and valves for conducting and controlling the supply and discharge of fluid under pressure to and from the rams.

Accordingly, it is a purpose of my invention to provide in a dump truck a single hydraulic mechanism which is double acting and operable selectively to perform the functions of raising the lifting arms, tilting the dump body, and oscillating the dump body for the purposes described.

It is also a purpose of my invention to provide such a single hydraulic mechanism that merely consists of two double-acting hydraulic rams each comprising a cylinder member and a piston member with one of said members operatively connected to the lifting arms and the other of said members operatively connected to the dump body; and valved means connected to the cylinder members of both rams for supplying fluid under pressure from a source selectively to one side of the piston member to effect movement of said members relatively to tilt the body to dumping position while maintaining the lifting arms against movement to lift the loading element, and to the other side of the piston member for effecting movement of the members relatively to move the arms to lift the loading element to dumping position, while maintaining the body in load-carrying position.

A further purpose of my invention is the provision of a safety latch which is automatically operable upon movement of the dump body to tilted position, to prevent the lifting arms from rising when the hydraulic rams are actuated to pull the dump body back to horizontal or load-carrying position.

I will describe only one form of dump truck and two forms of loaders therefor, two forms of double-acting hydraulic mechanisms for actuating the loaders and the dump body of the truck, and one form of safety latch, each embodying my invention, and will then point out the novel features thereof in claims.

In the accompanying drawings:

Fig. 2 is a view similar to Fig. 1, showing the dump body tilted to dumping position by the actuating mechanism.

Fig. 3 is an enlarged sectional view taken on the line 3—3 of Fig. 2.

Fig. 4 is an enlarged fragmentary sectional view taken on the line 4—4 of Fig. 1.

Fig. 5 is a vertical sectional view taken on the line 5—5 of Fig. 4.

Fig. 8 is an enlarged fragmentary top plan view of the truck of Fig. 7, the loader, and the stop means.

Fig. 9 is an enlarged vertical sectional view taken on the line 9—9 of Fig. 8.

Fig. 10 is a detail view of the stop means of Fig. 9 taken at right angles thereto, and partly in section.

Figure 1:
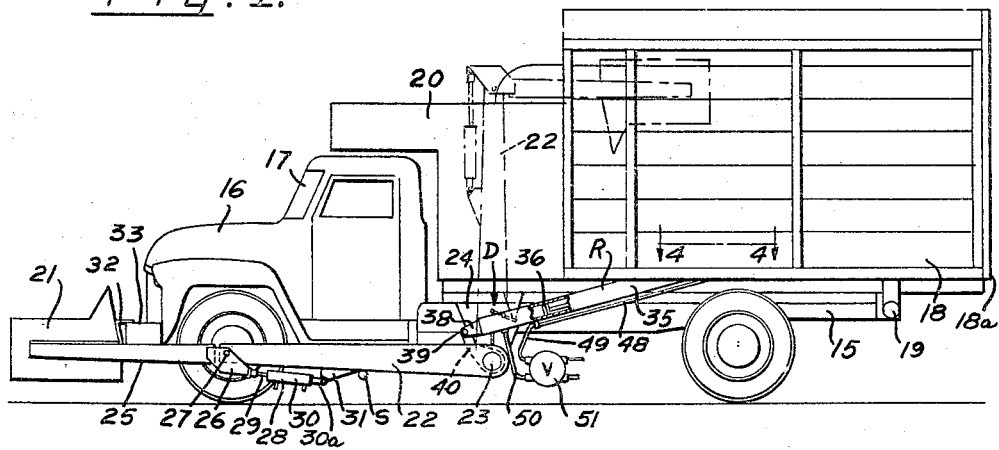
Fig. 1 is a view showing in side elevation a dump truck, and a loader therefor, equipped with one form of double-acting hydraulic actuating mechanism for the loader and the dump body, and wherein the two are in normal positions for loading.

Referring more particularly to the drawings, in Figs. 1 and 2 thereof is shown a dump truck conventional in form in that it comprises a wheel-supported frame 15 having an engine hood 16 at its forward end, a driver's cab 17 just to the rear of the hood, and a dump body 18 pivoted as at 19 on the rear end of the frame to occupy the load-carrying position shown in Fig. 1, or the load-dumping position shown in Fig. 2. The rear end of the body 18 is provided with a gate 18a, and as is usual in rubbish dump trucks, the forward end of the dump body 18 has fixed thereto a box 20 in which articles of value found in the rubbish can be deposited and carried separately from the dump body.

For loading the dump body 18 with rubbish, a loading element 21 is provided which may be in the form of a bucket or scoop, and this element is mounted on the truck frame 15 for swinging movement from the rubbish collecting position at the forward end of the truck, as shown in Fig. 1, upwardly and rearwardly over the cab 17 to a point directly over the forward end of the dump body where it is inverted to dump the rubbish into the body.

Any one of several forms of mechanisms may be employed for operating the loading element 21 in this manner, and, of course, restoring it to rubbish-collecting position. The only prerequisite of such a mechanism is that it include a pair of lifting arms, and means on the arms for inverting the loading element to discharge the rubbish into the dump body. Therefore, it is not intended that my invention be restricted in its application to the particular mechanism herein shown in connection with the truck of Fig. 1 or that of Fig. 7.

The mechanism shown in Fig. 1 has two lifting arms 22 at opposite sides of the truck frame 15 where they are supported for movement at their rear ends by means of a transverse shaft 23 mounted in brackets 24 depending from and fixed to the frame. The loading element 21 is carried by the forward ends of the arms 22 through the provision of a second pair of arms 25 fixed at their forward ends to opposite sides of the loading element and pivotally mounted on the forward ends of the lifting arms 22 by a pair of crank arms 26 which are fixed to the arms 25 and pivoted as at 27 on the forward ends of the arms 22.

For actuating the arms 25 a pair of hydraulic rams 28 are provided, and each ram has the rod 29 of its piston pivotally connected to the rear end of the respective crank arm 26, and its cylinder 30 pivoted as at 30a to a bracket 31 fixed to the respective lifting arm 22. Thus, when fluid under pressure is supplied to the two cylinders from a source through a suitable valve (not shown), the arms 25 are swung upwardly about the pivots 27 to move the loading element 21 to inverted position as shown in broken lines in Fig. 1. This inversion of the loading element occurs, of course, only after the lifting arms 22 have been swung to the vertical position likewise shown in broken lines in Fig. 1.

Normally, the arms 25 occupy a substantially horizontal position as illustrated in Fig. 1, and in which they are supported by a stop member 32 preferably in the form of an angle bar secured to the rear side of the loading element 21 so as to engage the top side of the front bumper 33 of the truck. In this position of the arms 25 the loading element 21, which may be in the form of a bucket into which rubbish is adapted to be loaded, occupies a position slightly elevated above the ground.

My invention in the embodiment shown in Figs. 1–6 comprises a hydraulic mechanism made up of a pair of double-acting hydraulic rams R, each of which includes a cylinder member 35, and a piston member 36 provided with the usual rod 37. One end of each cylinder member 35 is closed and provided with an ear 38 that is pivoted as at 39 to a crank arm 40 fixed to the shaft 23.

As best shown in Figs. 3, 4 and 5, each rod 37 is fixed at one end to the piston member 36, and provided at its other end with a cross sleeve 41 that is mounted on a cross pin 42 between a pair of sleeves 43 supporting the pin and fixed to a pair of ears 44. The ears 44 are fixed in inclined position in the upper end of a box-like structure 45 that is inclined upwardly and rearwardly from the bottom of the dump body 18 to form a pocket which accommodates the upper end portions of the cylinder 35 and the rod 37, as shown best in Fig. 5, to allow the dump body to occupy the load-carrying position shown in Fig. 1.

Fluid under pressure can be supplied in unison to the cylinders 35 at either side of the pistons 36 and simultaneously exhausted from the cylinders at the opposite side of the pistons, through pipes 48 fixed to and extending lengthwise of the cylinders and communicating with the upper ends thereof, and connected at their lower ends to hoses 49. A second pairs of hose 50 communicate with the lower ends of the cylinders 35, and both pair of hoses 49 and 50 are selectively connectible to the pressure and exhaust sides of a source (not shown) of fluid, preferably oil, under pressure through a suitable four-way valve 51 that is adapted to be located in the cab 17 within reach of the operator.

In the operation of the rams R to tilt the dump body to dumping position, the valve 51 is operated to supply fluid under pressure simultaneously to the cylinders 35 at the lower sides of the pistons 36 and to exhaust fluid from the cylinders at the upper sides of the pistons. This results in the pistons and the rods 37 being forced upwardly in the cylinders 35 to, in turn, exert a force upwardly on the dump body causing it to swing about its axis 19 to tilted position.

Concurrently with this operation of the pistons 36, the fluid at the lower side of each piston exerts an axial force against the lower end of the cylinder which, being tangent to the crank arm 40, tends to rotate the lifting arm 22 downwardly about the shaft 23 as a center. However, the arm 22 cannot so rotate because a stop member S in the form of a rod secured crosswise to the under side of the frame 15, is provided and against which the arms abut to prevent such rotation. Thus the force so exerted by the fluid can act only in a direction to drive the piston rods 37 upwardly and thereby move the dump body to tilted position.

Return of the dump body 18 to horizontal or load-carrying position is readily effected through operation of the valve 51 to supply fluid under pressure simultaneously to each of the cylinders 35 and at the upper side of the pistons 36, and, of course, to exhaust fluid from the cylinders at the lower sides of the pistons, thus actuating the pistons to pull the dump body back to horizontal position.

For actuating the loading element 21 in the manner previously described herein to load the dump body with rubbish, the lifting arms 22 can be raised to vertical position without tilting the dump body through operation of the rams R as follows:

Actuation of the valve 51 to supply fluid under pressure to the cylinders 35 at the top side of the pistons 36 causes the cylinders to move axially upward on the pistons thereby turning the crank arms 40 in a clockwise direction as when viewed in Fig. 1, and thereby lifting the arms 22 to vertical position. Since when initiating this cylinder movement the dump body is resting horizontally on the truck frame, the pistons are held against further movement downwardly in the cylinders so that the fluid, as supplied to the top side of the pistons, is caused to act against the upper ends of the cylinders to move the cylinders axially upward for the small distance required to swing the arms 22 to vertical position and before the lower ends of the cylinders can abut the pistons.

Raising of the arms 22 to vertical position is, of course, followed by operation of the rams 28 to swing the arms 25 to horizontal position whereby, the loading element 21 is inverted to discharge rubbish into the dump body. Since the loading element, when inverted, is at the forward end of the dump body, the rubbish is discharged thereinto at that end to cause uneven loading of the body. The body can be evenly loaded by oscillating it when in tilted position to cause the rubbish to move toward the rear end of the body, and thus to be evenly distributed along the length of the body. Such body oscillation also serves to compact the rubbish so that a maximum load can be carried, and to loosen the rubbish during a dumping operation to insure complete dumping thereof.

By virtue of my invention not only do the rams R serve to actuate the dump body and lifting arms 22 selectively in the manner described, but by supplying fluid under pressure to the cylinders 35 first to one side of the pistons 36 and then the other while the dump body is in tilted position, oscillation of the body can be effected to achieve the advantages aforesaid.

Figure 6:
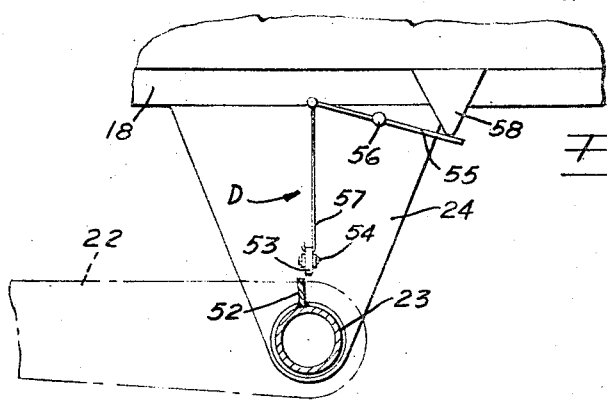
Fig. 6 is an enlarged side elevational view, partly in section, showing one form of safety latch for the lifting arms, carrying the loading element.

When the rams R are actuated to pull the dump body back to a horizontal position from a tilted position, there is a tendency, under certain conditions, to raise the lifting arms and thus lift the loading element 21, which, of course, is undesirable. To prevent this, a latching device D is provided which, as best shown in Fig. 6, comprises a keeper 52 fixed to and extending radially from the shaft 23, and a detent 53 pivoted as at 54 on one of the brackets 24 to gravitate to a lowered position in which it engages the keeper to prevent rotation of the shaft 23 in a clockwise direction and thus hold the lifting arms 22 against raising.

The latching device D also includes means operable by and upon movement of the dump body 18 back to horizontal position for elevating the detent 53 to clear the keeper 52, and to allow the detent to fall to lowered position to be engaged by the keeper, when the dump body is raised to tilted position. This means comprises a lever 55 fulcrumed between its ends as at 56 to the bracket 24, and a link 57 connected at one end to the lever and at the other end to the detent 53. The lever 55 is of a length such that its free end is disposed below a projection 58 so fixed on the dump body as to depress such end concurrently with movement of the dump body back to horizontal position, and to thus so rock the lever as to elevate the detent 53 clear of the keeper to permit the lifting arms to be raised.

Conversely, when the dump body is moved to tilted position the projection 58 is moved out of engagement with the lever 55 allowing the detent 53 to fall to lowered position and engage the keeper to prevent rotation of the shaft 23 such as to allow raising of the arms 22. Thus the latching device D is operable automatically to prevent raising of the lifting arms 22 when the dump body is being pulled back to horizontal position, or to permit raising of the arms once the dump body is restored to horizontal position.

Figure 7:
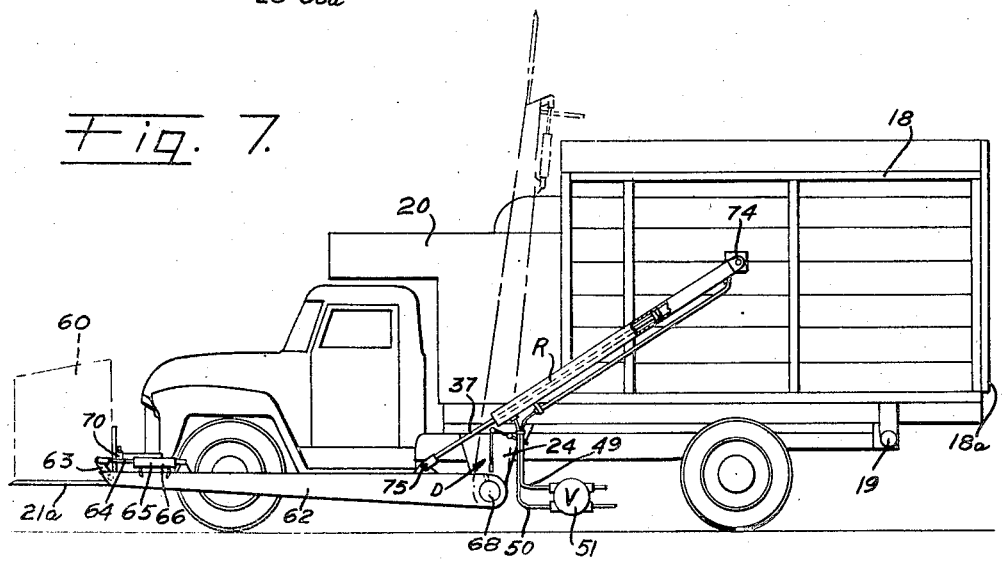
Fig. 7 is a view similar to Fig. 1 but showing another type of loader, another form of actuating means therefor and another form of stop means for the lifting arms.

In Fig. 7 is shown the same truck as in Fig. 1, but provided with a fork-type of loading element 21a upon which a rubbish container 60 may be placed. The vertical members and horizontal tines of this fork element are fixed to a cross shaft 61 mounted in the forward ends of a pair of lifting arms 62. Crank arms 63 are fixed to the shaft 61, and the piston rods 64 of a pair of hydraulic rams 65 are pivoted to the free ends of the crank arms. The cylinders 66 of the rams are pivoted to ears 67 fixed on the upper edges of the arms 62.

Manifestly, the rams 65 are operable in unison to swing the fork element 21a from the solid-line position shown in Fig. 7 upwardly to the inverted position shown in broken lines and, of course, only after the lifting arms 62 have been swung to vertical position. The arms 62 are mounted for such movement by fixing their rear ends to a cross shaft 68 which corresponds to shaft 23 of the mechanism of Fig. 1, and is likewise journalled in brackets 24.

Before describing the hydraulic mechanism for selectively lifting the arms 62 and tilting the dump body, and since it is essential to proper operation of such mechanism, the stop means for limiting movement of the arms downwardly or past a horizontal position and supporting the arms in such position, will now be described. This stop means comprises a round sleeve 70 welded or otherwise secured in vertical position to and at the front side of the front bumper 33 and midway between the ends of the latter.

A rod 71 is both rotatable and axially movable in the sleeve 70, and it has fixed to its lower end a laterally disposed supporting arm 72. Fixed to and extending crosswise through the upper end of the rod 71 is a pin 73 which normally seats at its ends in a pair of recesses 74 in the upper end of the sleeve 70 to secure the rod against turning. Lifting of the rod raises the pin out of the recesses to permit rotation thereof a half a turn to cause the arm 72 to occupy the position shown in solid lines in Fig. 9, or the position shown in broken lines. Once moved to either of these positions the rod is released allowing the pin to drop into the recesses and hold the rod, and, hence, the arm in such position.

In the solid-line position of the arm 72 (Fig. 8) it supports the shaft 61 to, in turn, support the lifting arms 62 in horizontal position wherein the fork element 21a is elevated from the ground. When the arm 72 is in the broken-line position, it is out of the path of downward movement of the shaft 61, thus permitting the lifting arms to be lowered to an inclined position in which the fork element rests on the ground for loading.

The hydraulic mechanism for selectively raising the lifting arms 62 and tilting the dump body 18, shown in Fig. 7, is identical to that shown in Fig. 1, except that the cylinders 35 of the rams R are pivotally connected as at 74 to the outer sides of the dump body, and the piston rods 37 are pivotally connected as at 75 to the arms 62. Manifestly, this is a reverse arrangement of the rams with respect to the lifting arms and dump body, but nevertheless they can be activated in unison by fluid under pressure through operation of the valve 51 to tilt the dump body while maintaining the lifting arms against raising, or to raise the lifting arms while maintaining the dump body in horizontal position.

Any tendency of the lifting arms 62 to rotate downwardly during operation of the rams to tilt the dump body, is prevented by the supporting arm 72 as extended forwardly beneath the shaft 61 and to which position it must be moved previously. Furthermore, any tendency of the lifting arms to rotate upwardly concurrently with pulling of the dump body back to horizontal position, is prevented since this truck is likewise provided with the latching device D.

What I claim is:

1. A dump truck, including: a frame; a body; means mounting the body on the frame for movement to occupy a load-carrying position and a load-dumping position; a pair of lifting arms one at each side of the frame; a loading element mounted on said arms; means supporting said arms for movement about an axis extending transversely of the frame to lift said element from a load-receiving position at the front end of the truck to a position above the body; and hydraulic mechanism including piston and cylinder members, one of said members operatively connected to said arms, and the other of said members operatively connected to the body, and valved means connected to the cylinder member and operable to supply fluid under pressure selectively to one side of the piston member to effect movement of said members relatively to move the body to dumping position while maintaining said arms against movement to lift the loading element, and to the other side of the piston member for effecting movement of said members relatively to move said arms to lift said element to a position above the body while maintaining the body in load-carrying position.

2. A dump truck, including: a frame; a body; means mounting the body on the frame for movement to occupy a load-carrying position and a load-dumping position; a pair of lifting arms one at each side of the frame; a loading element mounted on said arms; means supporting said arms for movement about an axis extending transversely of the frame to lift said element from a load-receiving position at the front end of the truck to a position above the body; a pair of hydraulic rams each including piston and cylinder members, one of said members operatively connected to said arms, and the other of said members operatively connected to the body, and valved means connected to the cylinder members and operable to supply fluid under pressure selectively to one side of the piston members to effect movement of said members relatively to move the body to dumping position while maintaining said arms against movement to lift the loading element, and to the other side of the piston member for effecting movement of said members relatively to move said arms to lift said element to a position above the body while maintaining the body in load-carrying position.

3. A dump truck, including: a frame; a body; means mounting the body on the frame for tilting movement from a substantially horizontal position to a load-dumping position; a pair of lifting arms one at each side of the frame; a loading element mounted on said arms; means supporting said arms for movement about an axis extending transversely of the frame to lift said element from a load-receiving position at the front end of the truck to a position above the body; and means common to and permanently connected with the body and said arms for actuating said arms to lift said element to a position above the body while maintaining the body in horizontal position, and for tilting the body while maintaining said element in load-receiving position.

4. A dump truck, including: a frame; a body; means mounting the body on the frame for tilting movement from a substantially horizontal position to a load-dumping position; a pair of lifting arms one at each side of the frame; a loading element mounted on said arms; means supporting said arms for movement about an axis extending transversely of the frame to lift said element from a load-receiving position at the front end of the truck to a position above the body; and hydraulic means common to and permanently connected with the body and said arms for actuating said arms to lift said element to a position above the body while maintaining the body in horizontal position, and for tilting the body while maintaining said element in load-receiving position.

5. A dump truck, including: a frame; a body; means mounting the body on the frame for movement to occupy a load-carrying position and load-dumping position; a pair of lifting arms one at each side of the frame; a loading element mounted on said arms; means supporting said arms for movement about an axis extending transversely of the frame to lift said element from a loading position at the front end of the truck to a position above the body; a pair of hydraulic rams each including piston and cylinder members, one of said members operatively connected to said arms, and the other of said members operatively connected to the body; valved means connected to the cylinder members and operable to supply fluid under pressure selectively to one side of the piston members to effect movement of said members relatively to move the body to dumping position while maintaining said arms against movement to lift the loading element, and to the other side of the piston member for effecting movement of said members relatively to move said arms to lift said element to a position above the body while maintaining the body in load-carrying position; coacting means operatively connected to said arms and to the frame for latching said arms against movement to lift said element; and means on the body for actuating said coacting means to unlatch said arms when the body is in load-carrying position.

6. A dump truck, including: a frame; a body; means mounting the body on the frame for movement to occupy a load-carrying position and a load-dumping position; a pair of lifting arms one at each side of the frame; a loading element mounted on said arms; means supporting said arms for movement about an axis extending transversely of the frame to lift said element from a load-receiving position at the front end of the truck to a position above the body; a pair of hydraulic rams the cylinders of which are operatively connected to said arms, and the piston rods of which are operatively connected to the body; and valved means connected to the cylinders and operable to supply fluid under pressure selectively to one side of the pistons for effecting movement of the piston rods upwardly to move the body to dumping position while maintaining said arms against movement to lift said element, and to the other side of the pistons for effecting movement of the cylinders downwardly for moving said arms to lift said element to a position above the body while maintaining the body in load-carrying position.

7. A dump truck, including: a frame; a body; means mounting the body on the frame for movement to occupy a load-carrying position and a load-dumping position; a pair of lifting arms one at each side of the frame; a loading element mounted on said arms; means supporting said arms for movement about an axis extending transversely of the frame to lift said element from a load-receiving position at the front end of the truck to a position above the body; a pair of hydraulic rams the piston rods of which are operatively connected to said arms, and the cylinders of which are operatively connected to the body; and valved means connected to the cylinders and operable to supply fluid under pressure selectively to one side of the pistons for effecting movement of the cylinders upwardly to move the body to dumping position while maintaining said arms against movement to lift said element, and to the other side of the pistons for effecting movement of the piston rods downwardly for moving said arms to lift said element to a position above the body while maintaining the body in load-carrying position.

8. A dump truck as embodied in claim 6, wherein stop means is provided on the frame for limting downward movement of said arms to prevent downward movement of the cylinders when the pistons are moved upwardly to move the body to dumping position.

9. A dump truck as embodied in claim 7, wherein stop means is provided on the frame for limiting downward movement of said arms to prevent downward movement of the pistons when the cylinders are moved upwardly to move the body to dumping position.

10. A dump truck as embodied in claim 6, wherein stop means is provided on the frame for limiting downward movement of said arms to prevent downward movement of the cylinders when the pistons are moved upwardly to move the body to dumping position; coacting means operatively connected to said arms and to the frame for latching said arms against movement to lift said element; and means on the body for actuating said coacting means to unlatch said arms when the body is in load-carrying position.

11. A dump truck, including: a frame, a body; means mounting the body on the frame for movement to occupy a load-carrying position and a load-dumping position; a pair of lifting arms pivotally supported at their rear ends on opposite sides of the frame for swinging movement about an axis extending transversely of the frame; a second pair of arms pivotally mounted at their rear ends on the forward ends of the lifting arms for swinging movement about a second axis parallel to the first-mentioned axis; a loading element fixed on the forward ends of said second arms; coacting means on said element and the frame for limiting downward movement of said second arms on the lifting arms; means on the frame for limiting downward movement of the lifting arms on the frame; hydraulic means connected to the lifting arms and said second arms operable to effect simultaneous swinging movement of said second arms and loading element; and a hydraulic mechanism including piston and cylinder members, one of said members operatively connected to the lifting arms, and the other of said members operatively connected to the body, and valve means connected to the cylinder member and operable to supply fluid under pressure selectively to one side of the piston member for effecting movement of said members relatively to move the body to dumping position, while maintaining the lifting arms against upward movement, and to the other side of the piston member for effecting movement of said members relatively to swing the lifting arms upwardly about said first-mentioned axis, while maintaining the body in load-carrying position.

12. A dump truck, including: a frame; a body; means mounting the body on the frame for movement to occupy a load-carrying position and a load-dumping position; a pair of lifting arms pivotally supported at their rear ends on opposite sides of the frame for swinging movement about an axis extending transversely of the frame; a shaft spanning and rotatable in the forward ends of the lifting arms; a loading element fixed to the shaft between said arms; stop means mounted on the forward end of the frame for movement to occupy a supporting position for the shaft to in turn limit downward movement of said arms, or to occupy a position permitting said arms to be lowered to bring the loading element into ground contact; hydraulic means on said arms operatively connected to the shaft for rotating the latter to turn the loading element; and a hydraulic mechanism including piston and cylinder members, one of said members operatively connected to the lifting arms, and the other of said members operatively connected to the body, and valve means connected to the cylinder member and operable to supply fluid under pressure selectively to one side of the piston member for effecting movement of said members relatively to move the body to dumping position, while maintaining the lifting arms against upward movement, and to the other side of the piston member for effecting movement of said members relatively to swing the lifting arms upwardly about said axis, while maintaining the body in load-carrying position.

References Cited in the file of this patent

UNITED STATES PATENTS

| | | |
|---|---|---|
| 2,441,591 | Owen | May 18, 1948 |
| 2,581,753 | Cooper | Jan. 8, 1952 |
| 2,699,876 | Smith | Jan. 18, 1955 |
| 2,709,368 | Wolpert | May 31, 1955 |
| 2,750,056 | Dow | June 12, 1956 |
| 2,784,853 | Bowles | Mar. 12, 1957 |